United States Patent [19]
Suez et al.

[11] 3,756,359
[45] Sept. 4, 1973

[54] SLIP COUPLING AND WESTON BRAKE FOR HOISTS

[75] Inventors: Kang Suez; Glenn S. Smith, both of Forrest City, Ark.

[73] Assignee: Eaton Corporation, Cleveland, Ohio

[22] Filed: June 23, 1971

[21] Appl. No.: 155,979

[52] U.S. Cl............... 192/16, 64/30 R, 254/187 R
[51] Int. Cl..................... F16d 13/30, F16d 67/02
[58] Field of Search................... 192/16, 15; 64/30 R

[56] References Cited
UNITED STATES PATENTS

| | | | |
|---|---|---|---|
| 2,501,096 | 3/1950 | Robins et al. | 192/15 |
| 3,493,087 | 2/1970 | Freeman et al. | 192/16 |
| 2,642,266 | 6/1953 | Dotson | 192/16 X |
| 2,770,339 | 11/1956 | Dotson | 192/16 |
| 3,605,443 | 9/1971 | Redelman | 64/30 R |

FOREIGN PATENTS OR APPLICATIONS

| 1,106,250 | 7/1955 | France | 64/30 |
|---|---|---|---|

Primary Examiner—Benjamin W. Wyche
Attorney—Leslie H. Blair et al.

[57] ABSTRACT

In a hoist, a Weston type brake mechanism is formed with a friction disk integral with the load shaft, and the driving element of the Weston brake mechanism as well as the ratcheted locking disk of the brake are mounted for rotation in the axis of the load shaft and are effective through the integral friction disk to control the load shaft directly so as to control the load at all times. The driving element of the Weston brake mechanism is made of two parts, one of which is a gear in frictional relationship to the other part, and held assembled thereto by means entirely contained between the two parts so that they function effectively as one. Any failure in the frictional relationship will not affect the functioning of the Weston brake mechanism to control the load.

7 Claims, 4 Drawing Figures

PATENTED SEP 4 1973

3,756,359

INVENTORS
K. SUEZ &
BY G. S. SMITH

TEAGNO & TODDY
ATTORNEYS

SLIP COUPLING AND WESTON BRAKE FOR HOISTS

This invention relates to a hoist, and more particularly, to braking mechanism and load limiting mechanism for a hoist.

Hoists equipped with load limiting mechanism, and with load brakes, are naturally quite old in the art. A particularly effective type of brake mechanism utilized in the hoist art is known as a Weston brake, and one such mechanism is found in the Schroeder U.S. Pat. No. 2,244,221. This mechanism embodies broadly a ratcheted brake disk that is adapted for free rotation in one direction, corresponding to a lift direction, but is held by a cooperating ratchet pawl against movement in a reverse direction. The load lifting and lowering means, including an axially movable driving element, are locked to the ratcheted disk by friction under certain conditions, as is well understood in the art, to hold the load against lowering movement. Release from the ratcheted disk to permit lowering of the load is easily effected by operating the load lifting means in a lowering direction.

A load brake similar to that shown by Schroeder is shown in the Juergens U.S. Pat. No. 1,867,409. There, the disk equivalent to the ratcheted disk of Schroeder, is held by a series of detents against rotation in a direction corresponding to the lowering of the load, and functions therefore just as does the Schroeder ratcheted disk to control the load. As a further detail, in Juergens a cam mechanism is utilized to bring about locking of the load lifting mechanism to the ratcheted disk, whereas in Schroeder a cam screw is utilized for the particular purpose.

Many means have been developed in the prior art for preventing overload, and one mechanism that has been suggested is a friction clutch such as found in the Robins et al. U.S. Pat. No. 2,501,096. Since a hoist must be designed to occupy as little space as possible, it is obvious that a friction clutch such as is found in Robins et al. is not entirely satisfactory. Thus, it is obvious that the friction disks utilized by Robins must be assembled relatively to one another and be retained in assembled position and that this requires space and a considerable number of parts.

Further, so far as is known, Weston brakes and friction clutches of the type heretofore utilized, have never been combined in effective relationship in a hoist. To understand this point, it will be well to consider that if the brake mechanism is in geared relation to the load shaft of the hoist, any failure of mechanism between the brake and the load shaft will obviously result in the load being released. Further, any direct association of the load limiting friction clutch mechanism and a brake of the class here being discussed, may also result in failure of the brake mechanism. This difficulty is naturally compounded where the brake mechanism is mechanically displaced from the load through the utilization of several elements between it and the load shaft.

As a feature of the invention of this application, a brake mechanism of the Weston type is utilized directly with the load shaft. Thus, a braking disk is secured integrally to the load shaft and rotates therewith so as to be locked to the ratcheted disk, if a disk such as found in the Schroeder patent is utilized, or with the detent controlled disk, if a disk such as found in Juergens is utilized.

As a further feature of the invention, a frictional overload clutch is formed as an integral part of the braking mechanism, but in a position in that mechanism where it cannot possibly interfere with the application of the brake. As a more particular feature of this part of the invention, the axially movable driving element of the Weston brake is formed as an assembly of two parts, with frictional means therebetween. One of the two parts is a circular braking disk, while the other part is a circular gear formed as a ring, with an inner ring surface fitted on the outer circular periphery of the disk.

As a more particular feature of this concept, the two parts of the axially movable driving element are held together by means extending therebetween, so that there are no external forces applied thereagainst, and so that the two parts will function normally as one part equivalent to the driving element of a Weston brake mechanism.

In summary, it may be stated that the invention of this application contributes the concept of a Weston brake applied directly to the load shaft of a hoist. It may further be stated that the concept of the invention also includes the utilization of a Weston brake directly on the load shaft together with a load limiting mechanism directly associated and built into parts of the Weston brake mechanism. It will be obvious further, that the invention here includes the additional concept of a novel load limiting frictional clutch, and particularly a clutch between two parts of an element of the Weston brake. The value of this last feature resides in the fact that no spring means or other mechanism will interfere in any way whatsoever with the normal operation of the driving element of the Weston brake, nor with its endwise movement required for both gripping the ratcheted or detent controlled disk, or for loosening its relation to the ratcheted or detent controlled disk.

The novel features that are believed to be characteristic of this invention are set forth with particularity in the claims appended hereto. The invention itself, however, both as to its organization and method of operation, together with further objects and advantages thereof can best be understood by reference to the following description taken in connection with the accompanying drawings in which:

Figure 1:
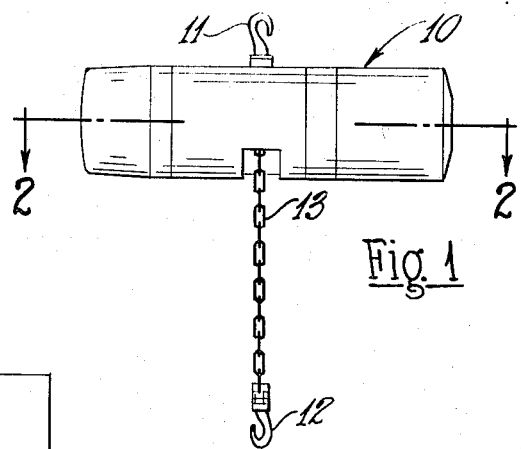
FIG. 1 is an elevation of a hoist of a type to which the invention may be applied.

Referring now more particularly to the drawings, a hoist to which the invention may be applied is best shown in FIG. 1 where it is designated generally by reference numeral 10. It includes a supporting hook 11, and a load supporting hook 12 at the end of a load chain 13 that is adapted to be moved upwardly or downwardly through winding on a standard type of sheave 15 best indicated in FIG. 2. It will naturally be understood by those skilled in the art that while the hoist is here designed for utilization with a chain 13, it may also be used in combination with a cable, a roller and link chain, or any other hoisting combination. The important point to consider is the fact that the load sheave 15 is formed integrally with a load shaft 16, this being the shaft that must be rotated in order to lift and lower the load through rotation of the sheave 15 in either of opposed directions.

For rotating the load shaft 16, there is utilized an electric motor (not shown), whose armature is fixed to an operating shaft 17. This operating shaft rotates at one end on a roller bearing 18, and terminates at 19 in a coupling 20 through which it is connected to a second operating shaft 21 traversing a central bored opening in the load shaft 16. Operating shaft 21 is suitably mounted in bearings as shown and carries a pinion 22 engaging the teeth of a gear 23 mounted at one end of a shaft 24. Shaft 24 is suitably supported in bearings 25 in the hoist casing and is equipped with a relatively long pinion 26 in engagement with the teeth 27 of a circular gear 28.

Circular gear 28 is one of the two parts of the hoist driving element utilizing a frictional clutch as earlier described generally. The other part of this element is designated by reference numeral 29, and it is a part of the Weston brake mechanism. Thus, it has a frictional surface at one side thereof in engagement with a friction disk 31 that bears against the locking disk 32 which in turn bears against a friction disk 33 adapted to engage friction disk 34 that is fixed, as by a key, to the load shaft 16.

Figure 3:
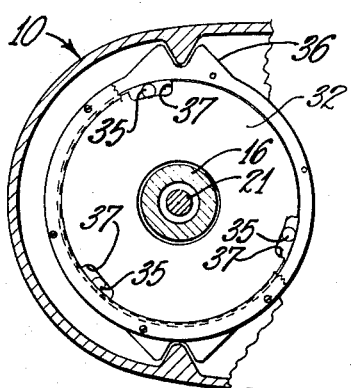
FIG. 3 is a section taken along line 3—3 of FIG. 2.
Figure 4:
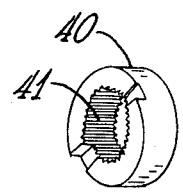
FIG. 4 is an isometric view of a cam utilized in connection with the Weston brake mechanism.

The locking disk 32 may be formed as a ratcheted disk cooperable with a pawl, such as found in many Weston brake mechanisms, and as illustrated in the Schroeder patent. It may, however, be also a detent controlled disk as shown in FIG. 3, similar to the disk found in the Juergens patent earlier referred to.

It is thought that detailed showing of the Weston brake mechanism, including the disk 32, need not be presented since the construction is quite old in the art and is well shown in the Juergens patent. It may be well to indicate generally, however, that the locking disk 32 is freely rotatable on the load shaft 16, but will not rotate in a load lowering direction through coaction of the detents 35 carried by a clutch ring 36, with cam slots 37 in the disk 32. As set forth in Juergens, rotation in one direction of the locking disk 32 is possible so as to permit the disk 32 to rotate in lifting direction with the friction disk 34 and the shaft 16. However, the locking disk 32 will not rotate in a reverse direction, and therefore will prevent rotation of the friction disk 34 and the shaft 16 when the disk 32 is frictionally locked to the disk 34, in accordance with the manner in which Weston hoist brakes are operated.

The two-part driving element 28, 29 is rotatably mounted on the load shaft 16, and is movable endwise relatively to the load shaft 16 through coaction with a cam 40 that operates similarly to the cam employed by Juergens. Cam 40 is itself, through teeth 41 locked to the load shaft 16, and since driving element 28, 29 is freely rotatable on the load shaft, it is obvious that any relative motion between the load shaft and the element 28, 29, will effect axial movement of element 28, 29 against the friction disk 31 to bind all of the parts including the disk 32, to the disk 34. Upon such binding, it is obvious that load lifting rotation of shaft 16 is possible through the intermediary of friction disk 34. The load shaft 16 will, however, be locked against lowering movement of the load through the locking of the locking disk 32 by the detents 35 unless the element 28, 29 is backed off or moved axially on shaft 16 to release the friction between the several parts of the Weston brake, as is common in the art.

Figure 2:
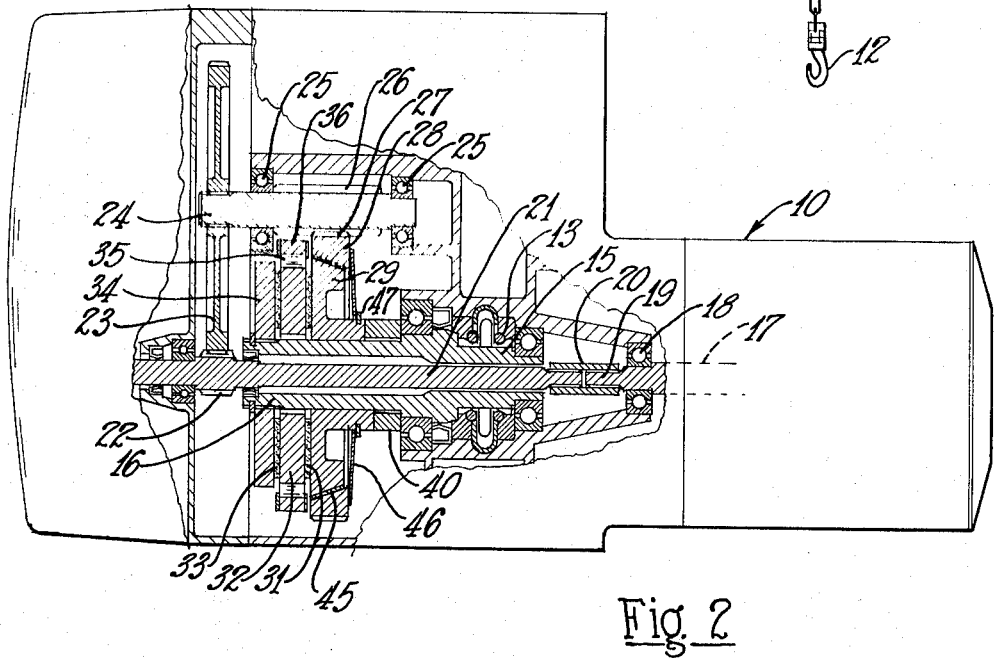
FIG. 2 is a partial section taken along line 2—2 of FIG. 1.

The two parts of element 28, 29 are held together through frictional means 45 therebetween, these frictional means being in the form of a frictional surface formed on either or both of the parts and occupying an angular position as shown. A spring disk 46 carried by the part 29 presses against the circular gear portion 28, urging it to the left as shown in FIG. 2 and against the part 29 so as to bring about a binding of the parts through the frictional means 45. It is readily seen, that because of the angular relation between the parts 28 and 29, the part 29 will actually limit the movement of the part 28 in one direction relatively to the part 29. Further, the spring disk 46 will prevent reverse movement of the two parts relatively to one another under normal operation conditions.

Therefore, the two parts 28 and 29 will act as one element and will actually be retained in assembled relation by the spring means 46 and the friction clutch surfaces at 45. The spring disk 46 is itself held in position by a retaining ring 47 also carried by the part 29. It can therefore be said that the two parts 28, 29 are held as a single unit normally, through means entirely found between the two parts. Therefore, there is nothing that in any way affects the relationship of the two parts 28, 29 relatively to one another to form a single element, and there is nothing that interferes with the combined axial movement of the two parts through action of the cam 40. Naturally, in all positions thereof, teeth 27 of gear 28 will mesh with long pinion 26 of shaft 24.

It will be appreciated, that while a cam 40 similar to the cam found in Juergens is here utilized to contribute axial motion to element 28, 29, the combined parts 28, 29 may be mounted on a screw formed on the shaft 16 as is common in many Weston type hoists, and as is found in the Schroeder patent.

It will now be appreciated that rotation of the shaft 17 will through its clutch relation to the shaft 21 bring about the rotation of the pinion 22, the gear 23, the shaft 24, and the circular gear 28. If the load is not greater than that which the friction clutch means 45 will effectively handle, the element 28, 29 will rotate, and through the cam 40 will be moved endwise to bring about a gripping of all of the parts on the shaft 16 relatively to the disk 34 fixed to the shaft 16. This will bring about rotation of the sheave 15 and a lifting of the load. By rotation of shaft 17 in a reverse direction, the element 28, 29 will be backed off axially slightly relatively to disk 32 to permit lowering of the load through a decrease of the friction between the several parts mounted on the shaft 16. If the shaft 16 then tends to rotate too swiftly, there will be a reverse relative movement between the element 28, 29 and the cam 40 secured to the shaft 16, and the load shaft 16 will again be locked or appropriately restrained by friction relative to the disk 32. The disk 32 will of course always prevent lowering movement of shaft 16 when it is locked by friction to the other parts mounted about shaft 16.

It will be seen that because the disk 34 is fixed to the load shaft 16, any destruction of any of the parts utilized to drive the part 29 of element 28, 29, will not in any way permit release of the load. Moreover, if friction at 45 is relieved in some manner, the part 29 will still be moved endwise by the cam 40 at all times to lock the disk 34 to the ratcheted or locking disk 32, as will be obvious. It is further obvious that any overload will cause a slipping action at 45 to prevent lifting of the load, while not in any manner decreasing the effectiveness of the part 29 to control the brake of the Weston mechanism as fully set forth. Therefore, it is believed that the very considerable contribution of the concept set forth will now be obvious, and that the merits of the invention will be appreciated by persons who are skilled in the art.

We now claim:

1. In a hoist of the class described, a load shaft on which the weight of a load is supported, a load lifting member such as a chain or the like, a winding member fixed to said load shaft and rotatable integrally therewith for winding and unwinding said load lifting member whereby to lift and lower a load, a Weston brake mounted to said load shaft comprising a disk fixed to said load shaft, a ratcheted locking disk rotatably mounted on said load shaft for rotation relatively thereto, a driving element rotatably mounted on said load shaft for rotation and axial movement relatively thereto, said driving element being formed of two parts, one of said parts being a circular disk rotatably mounted on said load shaft and having side surfaces connected by a peripheral surface generally extending axially along said load shaft, the other part being a circular gear formed as a ring having an inner ring surface fitted on said axially extending surface of said circular disk, means mounted between said axially extending surface and said inner ring surface for yieldingly compelling the integral rotation of said two parts, and means whereby rotation of said driving element relatively to said load shaft effects the axial movement of said driving element relatively to said load shaft to bind said ratcheted disk to said disk fixed to said load shaft.

2. In the combination of claim 1, the feature that the axial movement of said driving element is contributed by means fixed to said shaft and including gear means engaging the teeth of said circular gear to drive said two part driving element thereby.

3. In the combination of claim 1, the feature that said outer peripheral surface and said inner ring surface each form a conical surface extending along the axis of rotation thereof, and spring means pressing said circular gear axially of said disk to effect frictional binding of said conical surfaces.

4. In a hoist of the class utilizing a Weston brake comprising a friction disk fixed to a brake shaft, a ratcheted locking disk, a driving element, and means for moving said driving element axially of said shaft upon rotation thereof relatively to said shaft, the improvement that comprises forming said driving element of two parts, one of said parts being a circular disk rotatably mounted on said shaft and having an outer circular peripheral surface extending generally along the length of said shaft, the other part being a circular gear formed as a ring with an inner ring surface extending generally along the length of said shaft and being fitted on said outer circular peripheral surface, said circular gear having an outer ring surface with gear teeth thereon, clutch means mounted between said outer peripheral surface and said inner ring surface for yieldingly compelling the integral rotation of said two parts with said shaft, and gear means engaging said teeth of said circular gear.

5. In the combination of claim 4, the feature that said means yieldingly compelling the integral rotation of said two parts is friction means mounted between said outer peripheral surface and said inner ring surface.

6. In the combination of claim 4, the feature that said outer peripheral surface and said inner ring surface each form a conical surface extending along the axis of said brake shaft, and including spring means pressing said circular gear axially of said disk to effect frictional binding at said conical surfaces.

7. In the combination of claim 4, the feature that said means yieldingly compelling rotation of said two parts includes spring means extending along a side surface of said two parts and forming therewith a self contained assembly.

\* \* \* \* \*